(12) United States Patent
Mashimo

(10) Patent No.: US 6,990,056 B2
(45) Date of Patent: Jan. 24, 2006

(54) OPTICAL DISK DEVICE

(75) Inventor: Akira Mashimo, Tokorozawa (JP)

(73) Assignee: TEAC Corporation, Tokyo (JP)

( * ) Notice: Subject to any disclaimer, the term of this patent is extended or adjusted under 35 U.S.C. 154(b) by 72 days.

(21) Appl. No.: 10/082,129

(22) Filed: Feb. 26, 2002

(65) Prior Publication Data

US 2004/0160880 A1    Aug. 19, 2004

(30) Foreign Application Priority Data

Feb. 19, 2001   (JP)   ............................. 2001-042351

(51) Int. Cl.
*G11B 7/00*    (2006.01)
(52) U.S. Cl. .............................. 369/53.34; 369/44.13; 369/47.48; 369/124.11
(58) Field of Classification Search ............ 369/53.34, 369/44.13, 47.22, 47.48, 124.11, 124.12, 369/124.13
See application file for complete search history.

(56) References Cited

U.S. PATENT DOCUMENTS 5,459,706 A * 10/1995 Ogawa et al. ............ 369/53.31
6,614,745 B1 * 9/2003 Takeda et al. ........... 369/124.13
6,643,239 B2    11/2003 Nakajo

FOREIGN PATENT DOCUMENTS

| JP | 09-305976 A | 11/1997 |
|---|---|---|
| JP | 11-232649 | 8/1999 |
| JP | 2000-242940 | 9/2000 |
| JP | 2001-110056 A | 4/2001 |
| JP | 2001110056 A * | 4/2001 |
| JP | 2001-1134943 A | 5/2001 |

OTHER PUBLICATIONS

Electronic translation of JP 2001-110056.*

* cited by examiner

*Primary Examiner*—David Hudspeth
*Assistant Examiner*—Adam R. Giesy
(74) *Attorney, Agent, or Firm*—Christensen O'Connor Johnson Kindness PLLC

(57) ABSTRACT

A recordable or rewritable optical disk device capable of reproducing a wobble signal accurately at a high S/N ratio to thereby get address information even at a time of high-speed recording is disclosed. An optical disk is formed with wobbled guide tracks, and the light reflected from the optical disk is picked up by an optical pickup unit, which supplies corresponding electric signal to a wobble signal reproducing section. In the wobble signal reproducing section, at a time of recording, the input signal is sampled not only during a period of reproducing power and also during a period of recording power, and the two sampled signals are added to reproduce a wobble signal. The sampling during the period of recording power may be carried out within a period where the quantity of reflected light is in a stable condition after a pit is formed on the optical disk.

8 Claims, 8 Drawing Sheets

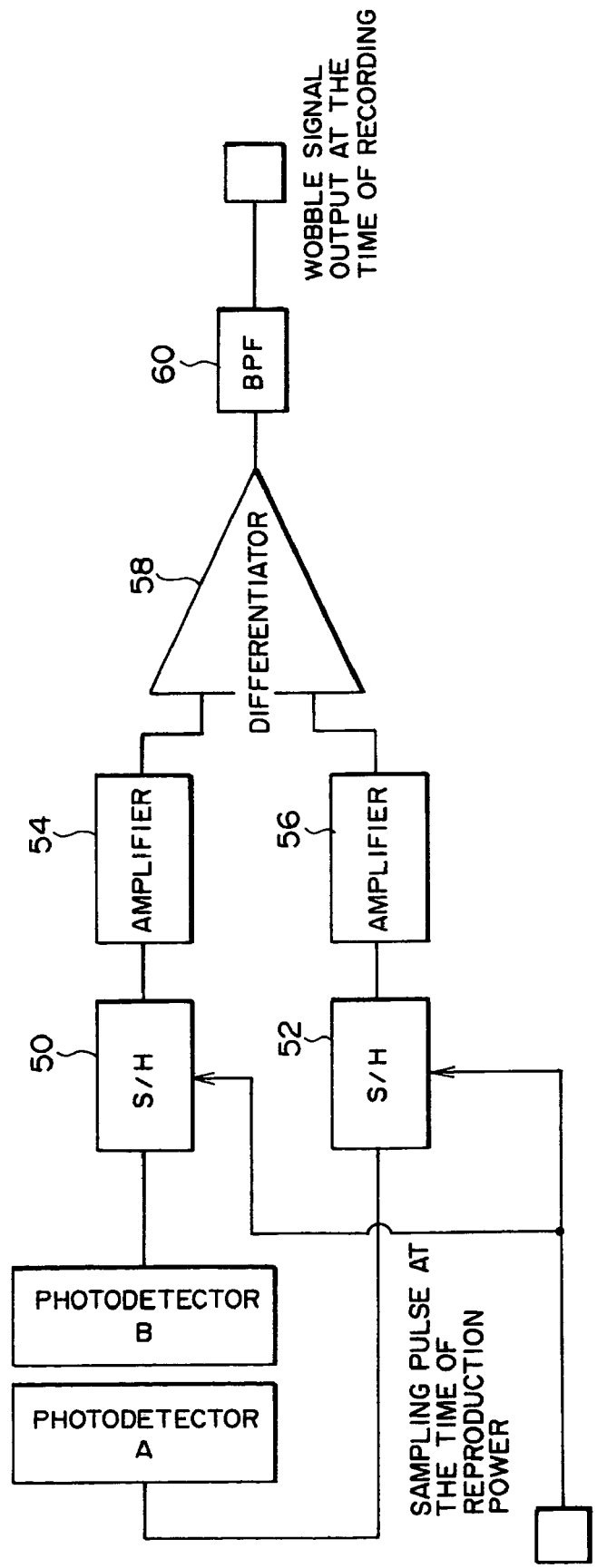

PRIOR ART

US 6,990,056 B2

1

OPTICAL DISK DEVICE

BACKGROUND OF THE INVENTION

1. Field of the Invention

The present invention relates generally to an optical disk device, and more particularly to reproduction a wobble signal in a recordable or rewritable optical disk device used with a CD-R (compact disk recordable) or a CD-RW (compact disk rewritable).

2. Description of the Related Art

Conventionally, in a recordable or rewritable optical disk such as a CD-R, CD-RW, DVD-R, DVD-RW, or DVD-RAM (digital versatile disk random-access memory), guide tracks are "wobbled" so as to record ATIP (absolute time in pregroove) or ADIP (address in pregroove) on the pregroove. The ATIP or the ADIP (hereinafter referred simply to as "address information") is used to acquire the current position of the optical disk, and according to this address information, a control of the recording or reproduction is performed.

The address information can be reproduced by taking out wobble components contained in an electric signal obtained by receiving the light reflected from the optical disk. For instance, assuming that a photodetector comprised of four quadrant photodiodes (having light receiving surfaces A, B, C and D) is used with two light receiving surfaces combination A and D and two light receiving surfaces combination B and C being divided in a radial direction of the optical disk, output signals obtained when the reflection light EFM-modulated (eight to fourteen modulation) depending on the presence of pits are received on the two light receiving surfaces combinations are in phase with each other. On the other hand, wobble signals at the two light receiving surfaces combinations are 180° out of phase with each other. Accordingly, by differentiating the output signals to remove EFM-modulated components, a wobble signal can be extracted.

FIG. 7 shows a circuit diagram of a wobble signal reproducing system used in a conventional optical disk device. Two photodetectors A and B divided in the radial direction of an optical disk receive the light beams reflected from the optical disk and output electric signals corresponding to intensities of the reflected light beams (in the case of quadrant photodetectors, it may be considered that two light receiving surfaces together form a single photodetector A, and the remaining two light receiving surfaces together form the other single photodetector B). The output signal from the photodetector B is supplied to a sample-hold circuit (S/H) 50, and the output signal from the photodetector A is supplied to a sample-hold circuit (S/H) 52. The sample-hold circuits 50, 52 are supplied with a sampling pulse, which is synchronized with the timing of light beam power at a time of reproduction. Based on the sampling pulse, the sample-hold circuits 50, 52 perform sampling of the output signals in a period of the light beam of reproduction power.

The sampling in the period of the light beam of reproduction power is achieved at a time of recording where a light beam of recording power and a light beam of reproduction power are alternately irradiated on to the optical disk. At a time of reproduction for reading out information recorded on the optical disk, the light beam is always irradiated with reproduction power, so that the sample-hold circuits 50, 52 can be passed over.

The signals that have been sampled and held by the sample-hold circuits 50, 52 are then amplified by amplifiers 54, 56, respectively, at a predetermined amplification factor

2 and subsequently supplied to a differentiator 58 that determines a difference between the two signals. The calculation of the difference by the differentiator 58 is achieved so as to remove EFM-modulated components. An output signal from the differentiator 58 is supplied to a band-pass filter (BPF) 60. The BPF 60 extracts from the input signal only components of frequencies near a predetermined wobble frequency (22 kHz, for example) and outputs the extracted components as a wobble signal.

FIG. 8 shows a timing chart illustrative of the manner in which the wobble signal is reproduced in the conventional optical disk device. At a time of recording, the light beam power is increased to melt part of a pigment layer on the surface of optical disk to thereby form a pit. In a recording operation, as indicated by (a) in FIG. 8, the reproduction power and the recording power appear in an alternate fashion. In general, since the length of a pit is in the range of 3T to 11T where T is a reference period in the "track" direction, the light beam power varies in a range of 3T to 11T. Conventionally, as indicated by (b) in FIG. 8, a wobble signal is reproduced by sampling and holding the output signal in a period of the light beam of reproduction power.

By thus reproducing the wobble signal within a period of the light beam of reproduction power, address information can be obtained at a time of recording. However, the conventional method is difficult to meet the recent demand for high-speed recording.

In a high-speed recording process, the reference period T becomes smaller as the rotational speed of the optical disk increases. Especially when the period of signals is set to be small such as 3T or 4T, it is difficult to perform sampling of the output signals from photodetectors. In general, the provability for the signals with short periods such as 3T to occur is relatively large with respect to the overall signals. Thus, a sampling failure in each of the short signal periods lowers the signal-to-noise (S/N) ratio of the wobbling signal. When the address information is demodulated based on a wobble signal with low S/N ratio, an error of demodulation may occur.

It is theoretically possible to provide a sample-hold circuit, which is capable of performing high-speed sampling required for high-speed recording. However, this measure in practice will make the device complicated in construction and costly to manufacture.

SUMMARY OF THE INVENTION

With the foregoing problems associated with the prior art in view, it is an object of the present invention to provide an optical disk device, which can surely reproduce a wobble signal to obtain address information even at a time of high-speed recording.

To achieve the foregoing object, according to one aspect of the present invention, there is provided an optical disk device comprising: irradiating means for irradiating a light beam onto a recordable optical disk having a wobbled track; light receiving means for receiving the light reflected from the optical disk and generating an electric signal corresponding to the reflected light; and wobble signal reproducing means for reproducing, from the electric signal generated by the light receiving means, a wobble signal corresponding to a wobble of the track, wherein the wobble signal reproducing means reproduces the wobble signal within a period of irradiation of the light beam with a recording power.

It is preferable that the wobble signal reproducing means reproduces the wobble signal within the period of irradiation of the light beam with recording power, and also within a period where the reflected light is in a stable condition at a predetermined level after a pit is formed on the optical disk.

The wobble signal reproducing means may further reproduce the wobble signal within a period of irradiation of the light beam with a reproduction power.

In another aspect, the present invention provides an optical disk device comprising: a light source that irradiates a light beam of recording power and a light beam of reproduction power alternately onto a recordable optical disk having a wobbled track; a photodetector having two light receiving surfaces divided in a radial direction of the optical disk, the photodetector receiving, on the two light receiving surfaces, the light reflected from the optical disk and generating a first and a second output signal, respectively; sample-hold circuits that sample and hold the first and second output signals, respectively, during a period of the light beam of recording power; and a differentiator that determines a difference between two signals from the sample-hold circuits, wherein the said wobble signal is reproduced on the basis of an output of the differentiator.

It is preferable that the sample-hold circuits, within the period of the light beam of recording power, sample the first and second output signals at the timing delayed by a predetermined period of time after the start of recording.

Preferably, the optical disk device may further comprise: second sample-hold circuits that sample and hold the first and second output signals during a period of the light beam of reproduction power; a second differentiator that determines a difference between two signals from the second sample-hold circuits; and an adder that adds the output of the differentiator and an output of the second differentiator, wherein said wobble signal is reproduced from an output of the adder.

The optical disk device may further comprises: a level adjusting circuit that equalizes the level of the signals outputted from the sample-hold circuits and the level of the signals outputted from the second sample-hold circuits.

In still another aspect, the invention provides an optical disk device comprising: a light source that irradiates a light beam of recording power and a light beam of reproduction power alternately onto a recordable optical disk having a wobbled track; a photodetector having two light receiving surfaces divided in a radial direction of the optical disk, the photodetector receiving, on the two light receiving surfaces, reflection light from the optical disk and generating a first and a second output signal, respectively; amplifiers that amplify the first and second output signals during a period of the light beam of recording power and a period of the light beam of reproduction power, respectively, at different amplification factors corresponding to the recording power and the reproduction power; and a differentiator that determines a difference between two signals from the amplifiers, wherein said wobble signal is reproduced on the basis of an output of the differentiator.

In the optical disk device of the present invention, at a time of recording, a light beam of recording power and a light beam of reproduction power are alternately irradiated onto the optical disk. During that time, a wobble signal is reproduced from an output signal from a photodetector within a period of the light beam of recording power. The recording power is stronger than the reproduction power. Thus, during the period of the light beam of recording power, the quantity of reflection light becomes large and the S/N ratio of the wobble signal increases with the result that the wobble signal can be reproduced reliably even at a time of high-speed recording. In addition, by reproducing the wobble signal not only within the period of the light beam of recording power, but also within a period of the light beam of reproduction power, it is possible to obtain address information without deteriorating the S/N ratio because even if reproduction of the wobble signal is not successful during a short signal period in a high-speed recording operation, the wobble signal can be reproduced during the period of the light beam of recording power and the period of the light beam of reproduction power in other signal durations.

BRIEF DESCRIPTION OF THE DRAWINGS

Certain preferred embodiments of the present invention will hereinafter be described in detail, by way of example only, with reference to the accompanying drawings, in which:

FIG. 7 is a circuit diagram showing the configuration of a wobble signal reproducing section of a conventional optical disk device.

DETAILED DESCRIPTION OF THE PREFERRED EMBODIMENTS

The following description is merely exemplary in nature and is in no way intended to limit the invention or its application or use.

Figure 1:
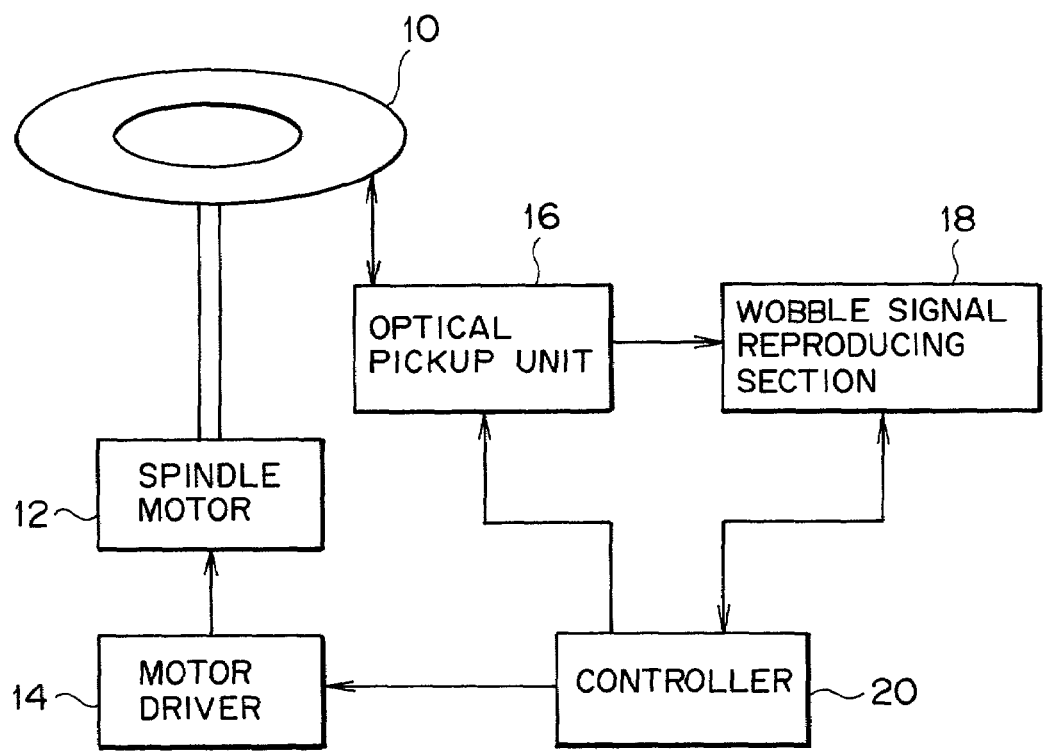
FIG. 1 is a block diagram showing the general arrangement of an optical disk device according to a first embodiment of the present invention.

Referring now to the drawings and FIG. 1 in particular, there is shown in block diagram the general arrangement of an optical disk device according to a first embodiment of the present invention. A recordable (or rewritable) optical disk 10 is formed with guide tracks wobbling in accordance with the ATIP as address information. The optical disk 10 is driven to rotate about the axis of a spindle motor 12. The spindle motor 12 is controlled on the basis of a drive control signal from a motor driver 14. The motor driver 14 controls the spindle motor 12 so that the optical disk 10 rotates, for example, at a constant linear velocity (CLV).

An optical pickup section or unit 16 is disposed in a position opposite to a recording surface of the optical disk 10. The optical pickup unit 16 comprises a laser diode (LD) that emits a light beam, a laser diode (LD) driver, an optical system that guides the light beam from the LD onto the recording surface of the optical disk and splits the reflection light reflected from a surface of the optical disk, and a plurality of photodetectors each receiving the reflection light and outputting it in the form of an electric signal. The optical pickup unit 16 is driven in a radial direction of the optical disk 10 by means of a feed mechanism. The LD emits a light beam of reproduction power at a time of reproduction. At a time of recording, the LD emits a light beam modulated by a recording signal and having a reproduction power and a recording power appearing in an alternate fashion, the recording power being higher than the reproduction power. The light beam emitted from the LD is irradiated onto the optical disk 10. At the time of reproduction, the light beam irradiated on the optical disk 10 is intensity-modulated by pits formed on the optical disk 10 and tracks wobbling on the optical disk 10 and then strikes on the photodetectors as reflection light. At the time of recording, the light beam irradiated on the optical disk 10 is subjected to a modulation when a pit is formed and also to an intensity modulation by the wobbled tracks. The modulated light beam then strikes on the photodetectors as reflection light. The plural photodetectors are divided into two pieces in the radial direction of the optical disk 10 and each output an electric signal corresponding to the intensity of the received reflection light. In a practical form, the photodetectors are formed of four quadrant photodiodes. For the convenience of explanation, in the illustrated embodiments, the photodetectors are comprised of a photodetector A and a photodetector B that are divided in the radial direction of the optical disk 10. Output signals of the photodetectors A and B, which are corresponding in intensity to the intensities of reflection light received on the photodetectors A and B, are supplied to a wobble signal reproducing section 18.

The wobble signal reproducing section 18 removes EFM-modulated components contained in the output signals to extract a wobble signal and demodulates address information from the wobble signal to supply the demodulated address information to a control section or controller 20. The wobble signal reproducing section 18 in the first embodiment does not perform sampling of the output signals to reproduce a wobble signal only within a period where the LD of the optical pickup unit 16 emits a light beam of reproducing power as in case of the conventional recording, but it performs reproduction of the wobble signal also in a period of the light beam of recording power. The wobble signal reproducing section 18 will be described in greater detail.

The controller 20 comprises a microcomputer and controls the motor driver 14, the optical pickup unit 16 and the wobble signal reproducing section 18 in a consolidated manner. More specifically, the controller 20 concurrently controls the feeding of the optical pickup unit 16 in the radial direction of the optical disk 10, power of the LD based on the recording signal, and the sampling timing by supplying a sampling pulse to the wobble signal reproducing section 18. The address information obtained at the wobble signal reproducing section 18 is supplied to the controller 20 and used for controlling the current position of the optical pickup unit 16.

In practice, the output signal from the optical pickup unit 16 is supplied also to a focus error signal generating circuit and a tracking error signal generating circuit (neither shown), so that the controller 20, based on the thus supplied output signals, controls focusing and tracking of the optical pickup unit 16. The focus and tracking control of the optical pickup unit 16 is achieved in the same manner as the conventional optical disk device and further description thereof can be omitted. The output signal from the optical pickup unit 16 is also supplied to an EFM demodulation circuit (not shown) for reproducing the recorded data. The recorded data reproduction is achieved in the same manner as the conventional optical disk device, and no further description thereof is needed.

Figure 2A:
FIG. 2 is a timing chart illustrative of the manner in which a wobble signal is reproduced according to the first embodiment.
Figure 2B:
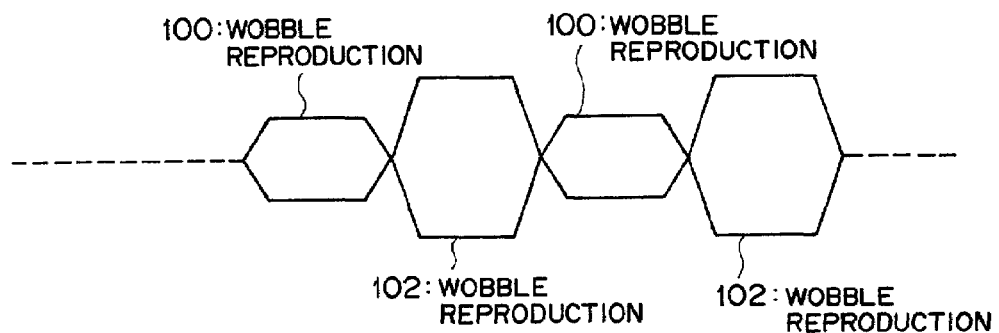
Figure 8A:
FIG. 8 is a timing chart illustrative of the manner in which a wobble signal is reproduced in the conventional optical disk device.
Figure 8B:
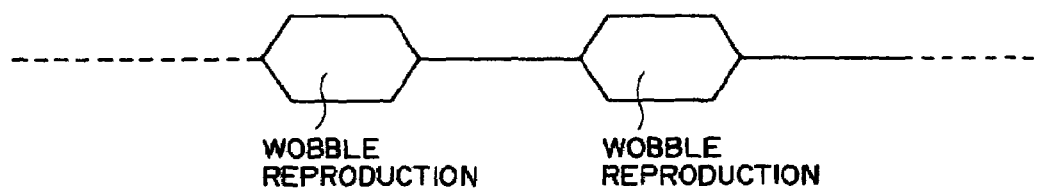

FIG. 2 is a time chart illustrative of the manner in which a wobble signal is reproduced at a time of recording according to the first embodiment of the present invention. As indicated by (a) in FIG. 2, at a time of recording, a light beam of reproducing power and a light beam of recording power appear in an alternate fashion, so that the pigment layer of the optical disk 10 (FIG. 1) is partly melted down by the light beam of recording power, thereby forming a pit. The wobble signal is reproduced not only during a period 100 the light beam of reproduction power but also during a period 102 of the light beam of recording power. A comparative study of FIG. 2 and FIG. 8 shows that the wobble signal reproduction timing of the present invention is completely different from that of the prior art. It will be appreciated that the reproduction of wobble signal achieved not only during the period of the light beam of reproduction power but also during the period of the light beam of recording power improves the S/N ratio of the wobble signal because even if the sampling is not possible during a short signal period such as 3T at the time of high-speed recording, the wobble signal can be reproduced more frequently than the prior art.

Figure 3:
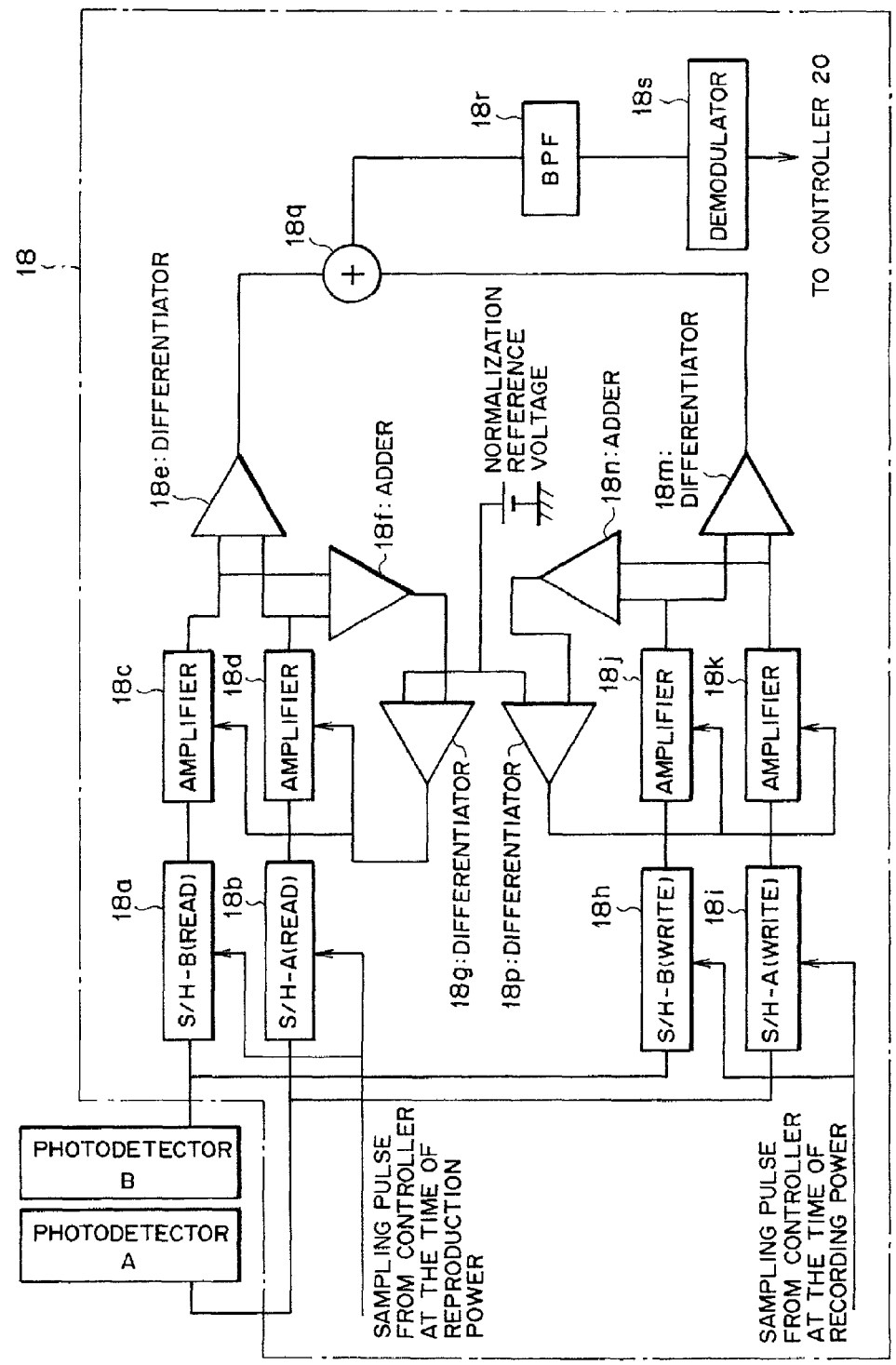
FIG. 3 is a circuit diagram showing the configuration of a wobble signal reproducing section shown in FIG. 1.

FIG. 3 shows a circuit diagram of the wobble signal reproducing section 18 shown in FIG. 1. The wobble signal reproducing section 18 generally comprises a sample-hold circuit that performs sampling and holding of output signals when the reproduction power is present, a sample-hold circuit that performs sampling and holding of the output signals when the recording power is present, and a circuit that adds output signals of the two sample-hold circuits.

As a sampling system for the period of the light beam of reproduction power, there are provided two sample hold circuits (second sample-hold circuits) 18a, 18b that hold output signals (first and second output signals) from the photodetectors A and B, respectively, amplifiers 18c, 18d that amplify signals from the sample-hold circuits 18a, 18b, respectively, and a differentiator (second differentiator) 18e that determines the difference between the two signals amplified by the amplifiers 18c, 18d. To the sample-hold circuits 18a, 18b is supplied a sampling pulse, which is synchronized with the timing of a light beam of reproduction power. At this timing, the output signals are held by the sample-hold circuits 18a, 18b. By determining the difference between the two signals by means of the differentiator 18e, it is possible to remove EFM-modulated components contained in the output signals, thereby extracting 180° out-of-phase wobble components alone.

The two signals amplified by the respective amplifiers 18c, 18d are also supplied to an adder 18f, which adds these signals and outputs the sum to one input terminal of a differentiator 18g. The adder 18f and the differentiator 18g are provided to equalize the level of the sampling system for the light beam of reproduction power and the level of a sampling system, described later, for the light beam of recording power. The adder 18f has the function of detecting a level of the sampling system for the light beam of reproducing power, and the differentiator 18g has the function of eliminating the difference in level between the sampling system for the light beam of reproduction power and the sampling system for the light beam of recording power. A reference voltage for normalization is supplied to the other input terminal of the differentiator 18g. Thus, by the difference or offset from the reference voltage appearing at the output terminal of the differentiator 18g, the amplification factors of the amplifiers 18c, 18d are adjusted to make the level of the sampling system for the light beam of reproduction power equal to a level of normalization.

As a sampling system for the light beam of recording power, there are provided two sample-hold circuits 18h, 18i that hold output signals from the photodetectors A and B, respectively, amplifiers 18j, 18k that amplify signals from the sample-hold circuits 18h, 18i, respectively, and a differentiator 18m that determines the difference between the two signals amplified by the amplifiers 18j, 18k. To the sample-hold circuits 18h, 18i is supplied a sampling pulse, which is synchronized with the timing of a light beam of recording power. At this timing, the output signals are held by the sample-hold circuits 18h, 18i. By determining the difference between the two signals by means of the differentiator 18m, it is possible to extract wobble components contained in the output signals.

The two signals amplified by the respective amplifiers 18j, 18k are also supplied to an adder 18n, which adds these signals and outputs the sum to one input terminal of a differentiator 18p. The adder 18n and the differentiator 18p correspond to the adder 18f and the differentiator 18g so that the adder 18n has the function of detecting a level of the sampling system for the light beam of recording power, and the differentiator 18p has the function of eliminating the difference in level between the sampling system for the light beam of reproduction power and the sampling system for the light beam of recording power. The reference voltage for normalization, which is the same as the one used in the sampling system for the light beam of reproduction power, is supplied to the other input terminal of the differentiator 18p, so that the level of the sampling system for the light beam of recording power is made equal to the normalization level.

By the operation of a level adjusting circuit formed jointly by the adders 18f, 18n and the differentiators 18g, 18p, the output levels of the amplifiers 18c, 18d and the output level of the amplifiers 18j, 18k, that is, the output levels of the differentiator 18e and differentiator 18m are adjusted to become equal to each other. Respective outputs of the differentiators 18e, 18m, that is, a wobble signal in a period of the light beam of reproduction power a wobble signal in a period of the light beam of recording power are both supplied to an adder 18q and thence to a band-pass filter (BPF) 18r. As in the case of the conventional optical disk device, the BPF 18r extracts from the input signal those components of frequencies near a predetermined wobble frequency (22 kHz, for example) and outputs the extracted components as a wobble signal to a demodulator 18s. Additional to the wobble signal sampled during a period of the light beam of reproduction power as in the case of the conventional device, the wobble signal sampled during a period of the light beam of recording power is supplied to the BPF 18r. Accordingly, even if the wobble signal cannot be reproduced in a short duration of signal such as 3T or 4T at a time of high-speed recording, it is possible for the demodulator 18s to demodulate address information accurately at a low error rate from the wobble signal.

In the arrangement shown in FIG. 3, both the level of the sampling system at the time of reproducing power and the level of the sampling system at the time of recording power are made equal to the normalization reference voltage to thereby equalize the levels of the output signals of the both sampling systems. The present invention should by no means be limited to the illustrated arrangement but may include an arrangement in which the level of the sampling system at the time of reproduction power is made equal to the level of the sampling system at the time of recording power, and the vice versa, so as to combine the output signals of the both sampling systems.

Although in the arrangement shown in FIG. 3, the sampling system at the recording power is supplied with a sampling pulse from the controller in synchronism with the recording timing for the sample-holding of the output signals based on the sampling pulse, the sampling timing may be adjusted in view of properties of the reflection light at the time of recording.

Figure 4:
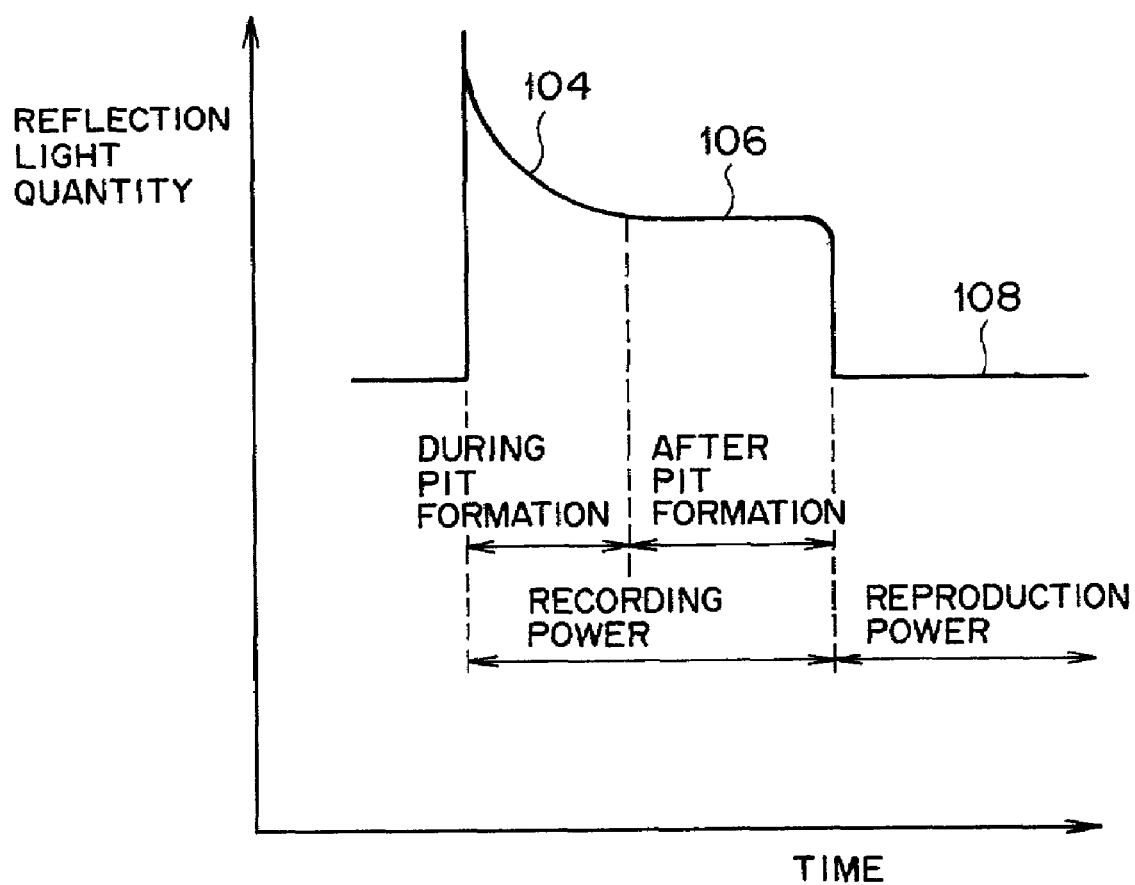
FIG. 4 is a graph showing the quantity of reflection light varying with time during recording.

FIG. 4 is a graph showing the quantity of reflection light varying with time in a recording process. In this figure, the horizontal axis represents time and the vertical axis represents the quantity of reflection light. A light beam of recording power is irradiated onto the optical disk 10 (FIG. 1). Immediately after the irradiation, the quantity of reflection light shows an instantaneous increase under the effect of large recording power. By the light beam of recording power, the pigment layer on a surface of the optical disk is partly diffused to start forming a pit whereupon the pits scatters the light beam and, due to this scattering, the quantity of reflection light decreases gradually, as indicated by a curvilinear line 104 show n in FIG. 4. When formation of the pit completes, the quantity of reflection light is in a stable condition at a constant level, as indicated by a rectilinear line 106 shown in FIG. 4. When the recording completes, power of the LD returns to the reproduction power, which is smaller than the recording power. Thus, the quantity of reflection light goes down to a lower level corresponding to the reproduction power, as indicated by a rectilinear line 108 shown in FIG. 4.

As explained above, immediately after the start of recording, an instantaneous increase in the quantity of reflection light occurs, which is followed by a transient gradual decreasing of the reflection light quantity. Thus, this time period usually makes it difficult to reproduce a wobble signal. In view of this, when the wobble signal is to be reproduced in the sampling system for the light beam of recording power, the sample-holding of output signals is retarded until after the quantity of reflection light becomes stable due to formation of a complete pit. This ensures that the wobble signal can be reproduced with improved reliability. To this end, the controller 20 (FIG. 1) is arranged to supply a sampling pulse to the sample-hold circuits 18h, 18i (FIG. 3) in synchronism with the stabilized duration of reflection light indicated by the rectilinear line 106 shown in FIG. 4. Retarding the recording signal by a predetermined period of time t provided that the time period from the start of recording to the occurrence of a stable condition of the reflection light quantity is represented by a constant value t can generate the sampling pulse. As an alternative, it is possible, according to the present invention, to generate a sampling pulse at the timing of a detection of the reflection light quantity being stabilized at a constant level while the quantity of reflection light is monitored.

Although only one preferred, but not limited, embodiment of the present invention has been disclosed and described, it is apparent that other embodiments and various modifications of the invention are possible.

Stated more specifically, in the arrangement shown in FIG. 1, the sampling system for a light beam of reproduction power and the sampling system for a light beam of recording power are used in combination (that is, the output signals of the both sampling systems are mixed up with each other) to reproduce a wobble signal not only during a period of the reproduction power but also during a period of the recording power so as to obtain address information. It is possible, according to the invention, to reproduce a wobble signal only in a period of the recording power by using the sampling system for the light beam of recording power alone, in a manner as described below with reference to FIG. 5.

Figure 5:
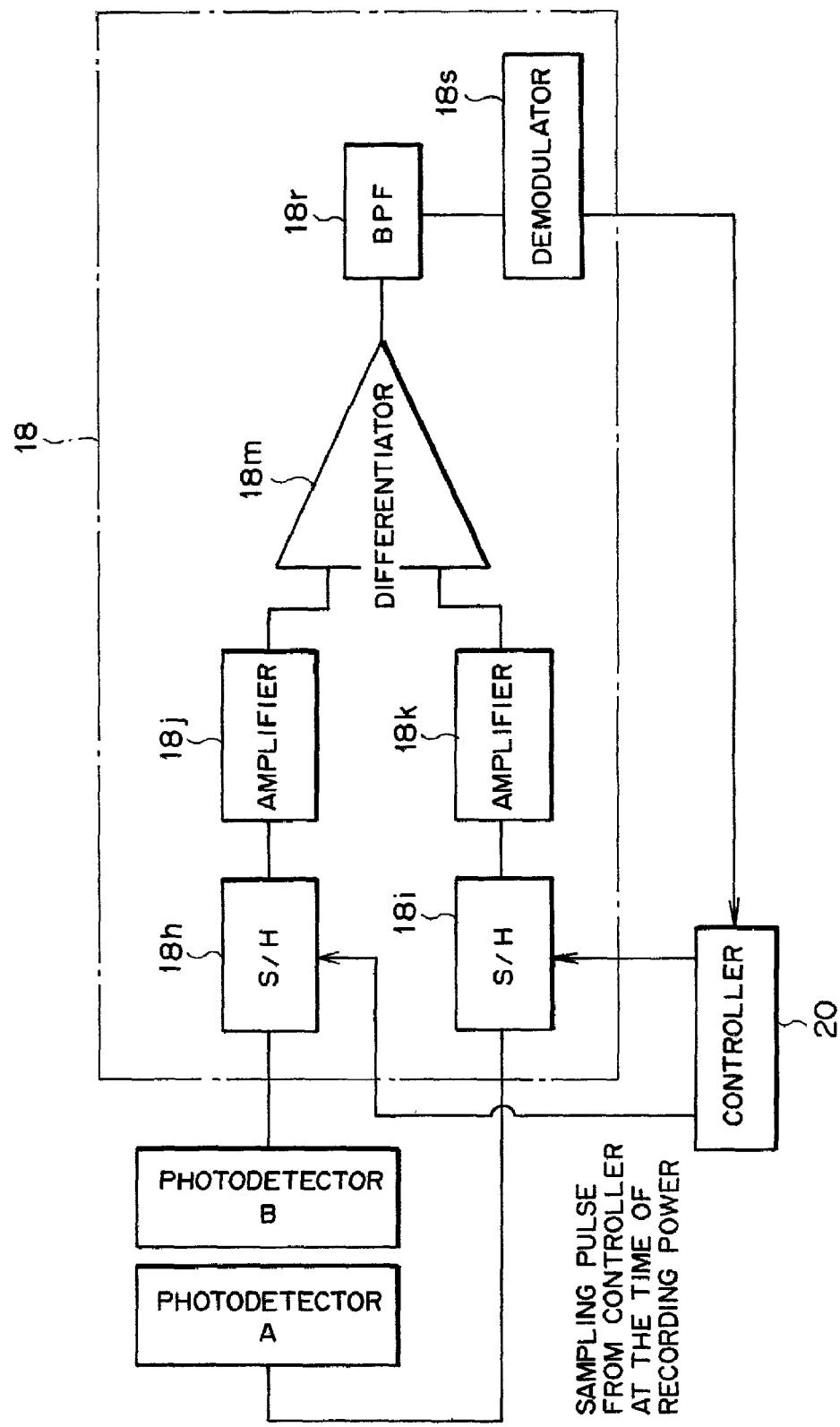
FIG. 5 is a circuit diagram showing the configuration of a wobble signal reproducing section according to a second embodiment of the present invention.

As shown in FIG. 5, output signals of the photodetectors A and B are supplied to sample-hold circuits 18$h$, 18$i$, respectively. At the sample-hold circuits 18$h$, 18$i$, a sampling pulse supplied from a controller 20 is used to sample and hold the output signals at the time of recording power. The sampling pulse from the controller 20 may be in synchronism with the recording signal or in phase with the timing a stabilized duration of the reflection light quantity as discussed above with reference to FIG. 4. Subjecting the recording signal to a delay process can generate the sampling pulse. Output signals of the sample-hold circuits 18$h$, 18$i$ are amplified by amplifiers 18$j$, 18$k$ and thereafter supplied to a differentiator 18$m$. By the differentiator 18$m$, the difference between the two signals is determined to remove EFM-modulated components, thereby extracting wobble components. A signal outputted from the differentiator 18$m$ is supplied to a band-pass filter BPF 18$r$ and thence to a demodulator 18$s$ where address information is demodulated from the wobble signal. In this embodiment, the wobble signal is reproduced only in the duration of recording power. Accordingly, as in the case of the reproduction of the wobbling signal only in the duration of reproduction power, an error may occur in a short duration of signals such as 3T or 4T at a time of high-speed recording. However, in other signal durations such as 5T or longer, a reflection light quantity larger than that in the duration of reproduction power can be obtained, so that the signal level (S level) becomes high. This ensures that the wobble signal can be reproduced at a higher S/N ratio than the conventional device.

In the circuit arrangement shown in FIG. 3, both the sampling system for a light beam of reproduction power and the sampling system for a light beam of recording power. Since in FIG. 3 the wobble signal is reproduced both in the duration of recording power and in the duration of reproduction power at a time of recording, the sampling of the output signals can be passed over, as will be described below with reference to FIG. 6.

Figure 6:
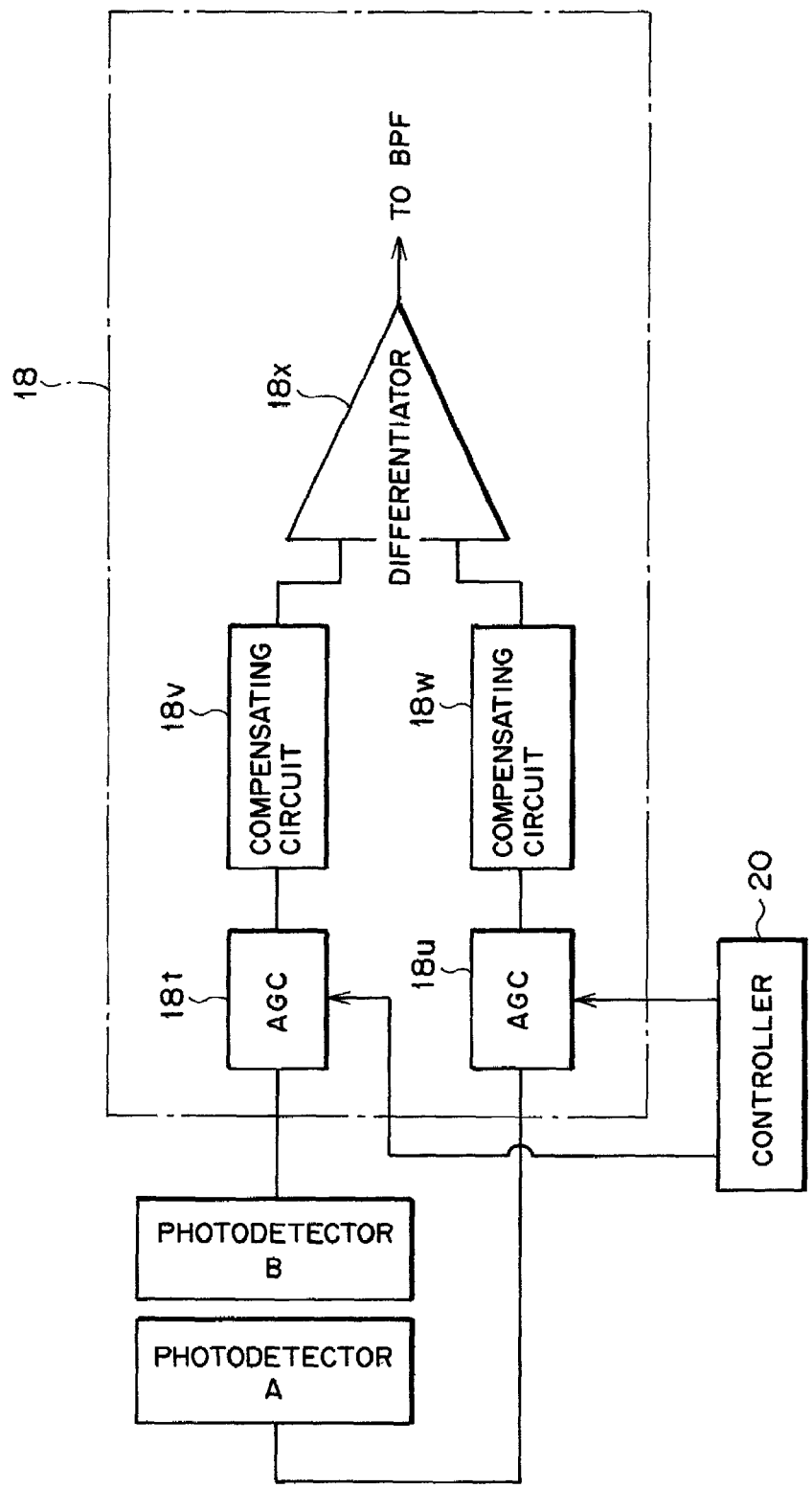
FIG. 6 is a circuit diagram showing the configuration of a wobble signal reproducing section according to a third embodiment of the present invention.

In a wobble signal reproducing section 18 shown in FIG. 6, output signals from the respective photodetectors A and B are supplied to automatic gain control circuits (AGC) 18$t$, 18$u$, respectively. To the AGCs 18$t$, 18$u$ are supplied gain control signals from a controller 20 so that the outputs from the photodetectors A, B are amplified by the AGCs 18$t$, 18$u$ under the control of the gain control signals. In order to equalize the level in the duration of reproduction power and the level in the duration of recording power, the controller 20 supplies a first and a second gain control signal alternately, which signals are determined in accordance with the reproduction power and the recording power, respectively. For example, for the duration of reproduction power, the ratio of recording power to reproduction power may be supplied as an amplification factor or gain to the AGCs 18$t$, 18$u$. The signals amplified by the AGCs 18$t$, 18$u$ are supplied to compensating circuits 18$v$, 18$w$, respectively. The compensating circuits 18$v$, 18$w$ are arranged to remove frequency components resulting from an eccentricity of the optical disk 10 (FIG. 1) and other low frequency components (noises). A typical example of such compensating circuits 18$v$, 18$w$ is disclosed in Japanese Patent Laid-open Publication No. 9-73636. The disclosed compensating circuit includes a low-pass filter formed by a capacitor and a resistor and a variable-gain amplifying circuit, wherein the low-pass filter extracts the low frequency components resulting from the eccentricity of the optical disk. The extracted low frequency components are inverted in phase and then supplied to the variable-gain amplifying circuit, so that a level change caused due to the eccentricity of the optical disk is thus compensated for. The signals free from eccentricity-dependent components are supplied to a differentiator 18$x$ where EFM-modulated components are removed. The output of the differentiator 18$x$ is supplied to a demodulator 18$s$ where address information can be obtained in the same manner as described above.

In the arrangement shown in FIG. 6, the wobble signal can be reproduced both in the duration of reproduction power and the duration of recording power. This makes it possible to reproduce a wobble signal at a sufficiently high S/N ratio during high-speed recording.

Obviously, various minor changes and modifications of the present invention are possible in the light of the above teaching. It is therefore to be understood that within the scope of the appended claims, the present invention may be practiced otherwise than as specifically described.

What is claimed is:

1. An optical disk device comprising:
    irradiating means for irradiating a light beam onto a recordable optical disk having a wobbled track;
    light receiving means for receiving the light reflected from the optical disk and generating an electric signal corresponding to the reflected light; and
    wobble signal reproducing means for reproducing, from the electric signal generated by the light receiving means, a wobble signal corresponding to a wobble of the track, wherein at any given recording speed said wobble signal reproducing means reproduces the wobble signal within a period of irradiation of the light beam with a recording power and also reproduces the wobble signal within a period of irradiation of the light beam with a reproduction power.

2. The optical disk device according to claim 1, wherein said wobble signal reproducing means reproduces said wobble signal within the period of irradiation of the light beam with recording power, and also within a period where the reflected light is in a stable condition at a predetermined level after a pit is formed on the optical disk.

3. An optical disk device comprising:
    a light source that irradiates a light beam of recording power and a light beam of reproduction power alternately onto a recordable optical disk having a wobbled track;
    a photodetector having two light receiving surfaces divided in a radial direction of the optical disk, said photodetector receiving, on the two light receiving surfaces, the light reflected from the optical disk and generating a first and a second output signal, respectively;
    sample-hold circuits that sample and hold the first and second output signals, respectively, during a period of the light beam of recording power;
    a differentiator that determines a difference between two signals from said sample-hold circuits;
    second sample-hold circuits that sample and hold the first and second output signals during a period of the light beam of reproduction power;
    a second differentiator that determines a difference between two signals from said second sample-hold circuits, wherein said wobble signal is reproduced on the basis of an output of said differentiator and an output of said second differentiator.

4. The optical disk device according to claim 3, wherein said sample-hold circuits, within the period of the light beam of recording power, sample the first and second output signals at the timing delayed by a predetermined period of time after the start of recording.

5. The optical disk device according to claim 3, further comprising:

an adder that adds the output of said differentiator and an output of said second differentiator, wherein the wobble signal is reproduced from an output of the adder.

6. The optical disk device according to claim 3, further comprising:

a level adjusting circuit that equalizes the level of the signals outputted from the sample-hold circuits and the level of the signals outputted from said second sample-hold circuits.

7. The optical disk device according to claim 4, further comprising:

an adder that adds the output of said differentiator and an output of said second differentiator, wherein the wobble signal is reproduced from an output of the adder.

8. The optical disk device according to claim 7, further comprising:

a level adjusting circuit that equalizes the level of the signals outputted from the sample-hold circuits and the level of the signals outputted from said second sample-hold circuits.

* * * * *